(12) United States Patent
Takano

(10) Patent No.: US 8,813,800 B2
(45) Date of Patent: Aug. 26, 2014

(54) PNEUMATIC TIRE

(75) Inventor: Hirokazu Takano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 320 days.

(21) Appl. No.: 13/272,271

(22) Filed: Oct. 13, 2011

(65) Prior Publication Data
US 2012/0111466 A1 May 10, 2012

(30) Foreign Application Priority Data
Nov. 5, 2010 (JP) ................................. 2010-249008

(51) Int. Cl.
B60C 11/11 (2006.01)
(52) U.S. Cl.
USPC .................................... 152/209.18
(58) Field of Classification Search
USPC ............. 152/209.18, 209.28, 902, 903, 209.1
See application file for complete search history.

(56) References Cited

U.S. PATENT DOCUMENTS

| 6,105,644 | A | * | 8/2000 | Ikeda | 152/209.8 |
| D613,242 | S | * | 4/2010 | Izumi | D12/600 |
| 2010/0101695 | A1 | * | 4/2010 | Ueda | 152/209.15 |

FOREIGN PATENT DOCUMENTS

| JP | 2000-135904 A | | 5/2000 |
| JP | 2001-206017 | * | 7/2001 |
| JP | 2002-103919 | * | 4/2002 |
| JP | 2003-072321 | * | 3/2003 |

OTHER PUBLICATIONS

English machine translation of JP2003-072321, dated Mar. 2003.*

* cited by examiner

Primary Examiner — Steven D Maki
Assistant Examiner — Robert Dye
(74) Attorney, Agent, or Firm — Birch, Stewart, Kolasch & Birch, LLP

(57) ABSTRACT

In a pneumatic tire 1, a center land portion 5a between center main grooves 3, a middle land portion 5b between the center main groove 3 and a shoulder main groove 4, and a pair of shoulder land portions 5c extending on outer sides of the shoulder main groove 4 in a tire axial direction are divided from each other. The center main groove 3 includes arc groove pieces 6 which are continuously provided in a tire circumferential direction. The arc groove piece 6 includes an arc portion 7 which is curved to swell toward a tire equator C. The middle land portion 5b is provided with a middle inclined groove 9 which extends from an intersection portion K of the arc groove piece 6 toward the shoulder main groove 4.

7 Claims, 4 Drawing Sheets

PNEUMATIC TIRE

BACKGROUND OF THE INVENTION

1. Field of the Invention

The present invention relates to a pneumatic tire in which shapes of grooves formed in a middle portion are improved, thereby enhancing drainage performance while maintaining uneven wear resistance.

2. Description of the Background Art

A pneumatic tire of a block pattern in which a plurality of blocks is formed on a tread portion of the tire is known. In recent years, it is desired to further enhance drainage performance of the pneumatic tire. To enhance the drainage performance, it is necessary to smoothly discharge, toward a ground-contact end, a water film between the tread portion and a road surface, especially a water film near a tire equator. To smoothly discharge such a water film, it is known to increase a width and/or a depth of a groove in a middle portion which lies between the ground-contact end and the tire equator.

However, the above-described technique has a problem that since rigidity of the block is lowered, the uneven wear resistance is prone to be deteriorated. Enhancement of the drainage performance and securement of rigidity of the block are in an antinomic relation, and it is difficult to satisfy both of them. There is a related art as follows:

CONVENTIONAL ART

[Patent Document 1] Japanese Patent Application Publication No. 2000-135904.

SUMMARY OF THE INVENTION

The present invention has been accomplished in view of such a problem, and shapes of grooves formed in the middle portion are improved. Based on this, it is a main object of the invention to provide a pneumatic tire capable of enhancing the drainage performance while maintaining uneven wear resistance by securing rigidity of the block.

In accordance with an aspect of the present invention, a pneumatic tire is provided at a tread portion with a pair of center main grooves which continuously extend on both sides of a tire equator in a tire circumferential direction, and a pair of shoulder main grooves which continuously extend on outer sides of the center main grooves in the tire circumferential direction, thereby dividing the tread portion into a center land portion located between the center main grooves, a middle land portion located between the center main groove and the shoulder main groove, and a pair of shoulder land portions which extend on outer sides of the shoulder main grooves in a tire axial direction. The center main groove is formed into a zigzag shape by connecting arc groove pieces to each other in the tire circumferential direction, each of the arc groove pieces includes an arc portion which is curved to swell toward the tire equator. Such a center main groove can efficiently discharge a water film between a road surface and a portion of the tread portion near the tire equator. Especially, since a zigzag amplitude of the center main groove is 2 to 5% of a tread width, water can efficiently be discharged while securing rigidity of the land portion of the center land portion.

Further, the middle land portion is provided with a middle inclined groove extending from an intersection portion of the arc groove pieces toward the shoulder main groove at an angle of 12 to 30° with respect to the tire circumferential direction. According to such a middle inclined groove, drainage in the center main groove is guided to the shoulder main groove utilizing rotation of the tie, and the drainage performance can further be enhanced. The middle inclined groove extending at such an angle can exert the drainage function without excessively lowering the rigidity of the middle land portion. Therefore, the uneven wear resistance and the steering stability are maintained.

A tip end angle of a land portion sandwiched between the middle inclined groove and the center main groove is in a range of 30 to 75°. Hence, a portion of the drainage in the center main groove is smoothly discharged to a last-come side of the center main groove in a tire rotation direction and/or to the middle inclined groove, and it is possible to prevent rigidity of the land portion sandwiched between the middle inclined groove and the center main groove from being lowered. Therefore, the uneven wear resistance and the steering stability are maintained, and the drainage performance is enhanced.

A groove width of the middle inclined groove is gradually reduced toward a ground-contact end. Such a middle inclined groove increases a flowing speed of water in the middle inclined groove toward the ground-contact end, and enhances lateral rigidity of a region of the middle land portion on an outer side in the axial direction where a ground-contact pressure is increased at the time of cornering. Therefore, the uneven wear resistance and the drainage performance are maintained in well balance.

DESCRIPTION OF THE PREFERRED EMBODIMENTS

An embodiment of the present invention will be described below based on drawings.

Figure 1:
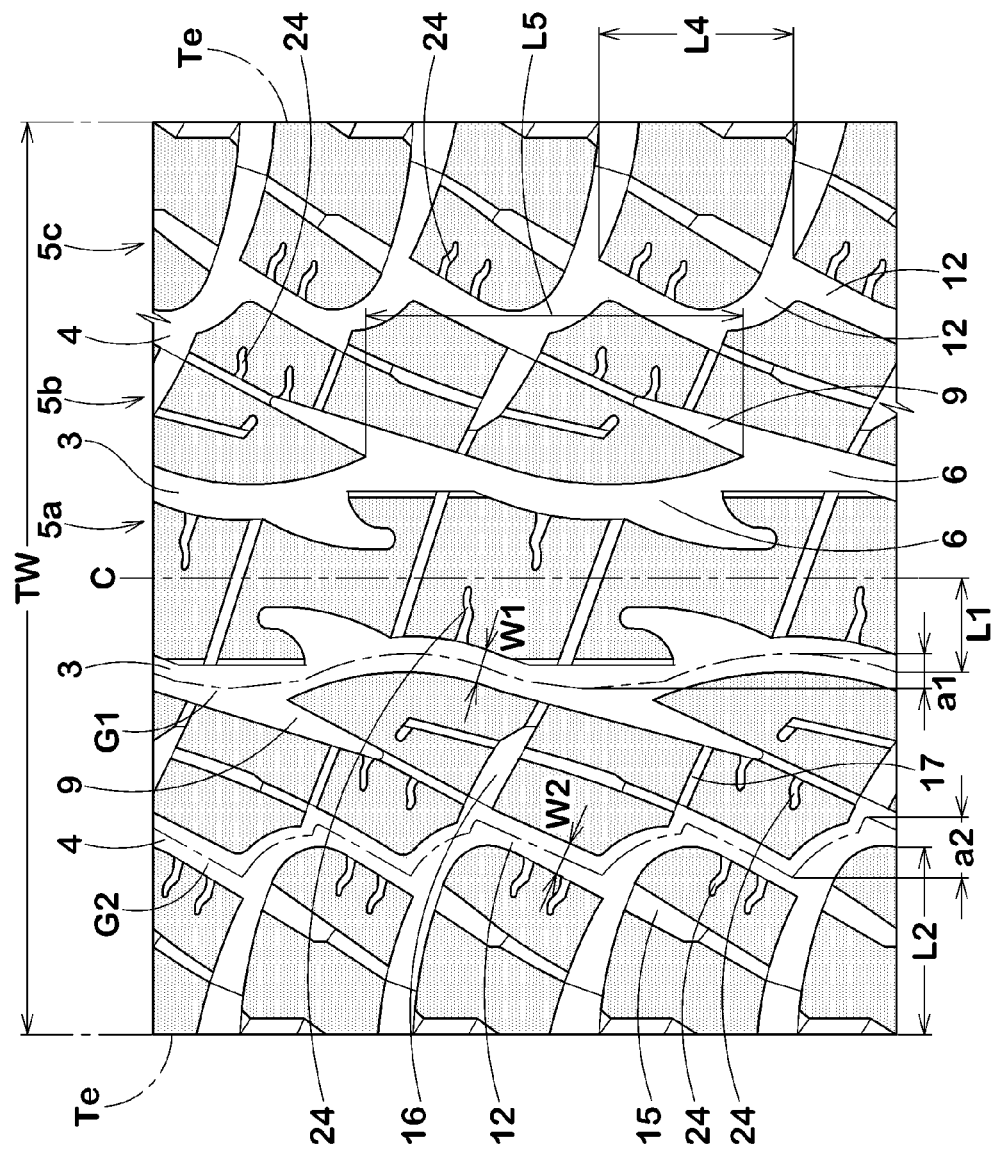
FIG. 1 is a development view of a tread portion showing a pneumatic tire according to an embodiment of the present invention.

As shown in FIG. 1, a pneumatic tire (hereinafter, also referred to simply as "tire") 1 is preferably utilized as a tire for a passenger vehicle.

A tread portion 2 of the pneumatic tire 1 of the embodiment is provided with a pair of center main grooves 3 continuously extending in a tire circumferential direction on both sides of a tire equator C, and a pair of shoulder main grooves 4 continuously extending in the tire circumferential direction on outer sides of the center main grooves 3. According to this, the tread portion 2 of the embodiment is divided into one center land portion 5a extending between the center main grooves 3, a pair of middle land portions 5b extending between the center main grooves 3 and the shoulder main grooves 4, and a pair of shoulder land portions 5e extending on outer sides of the shoulder main grooves 4 in a tire axial direction. A tread pattern of the embodiment is formed substantially into a point symmetric pattern around an arbitrary point on the tire equator C except variable pitch.

Groove widths of the center main grooves 3 and the shoulder main grooves 4 (the groove widths are perpendicular to a longitudinal direction of the grooves, and this definition is applied also to other grooves) W1 and W2 can variously be defined in accordance with customary practice. However, if the groove widths W1 and W2 and/or groove depths are excessively large, there is a possibility that a ground-contact area is reduced and rigidities of the land portions 5a to 5c are lowered and, on the other hand, if the groove widths and/or the groove depths are excessively small, there is a possibility that drainage performance is deteriorated. Hence, it is preferable that the groove widths W1 and W2 of the center main grooves 3 and the shoulder main grooves 4 are in a range of 3.0 to 8.0% of the tread width TW, for example. The groove depths of the center main grooves 3 and the shoulder main grooves 4 are preferably in a range of 11.0 to 15.0 mm.

Installation positions of the center main grooves 3 and the shoulder main groove 4 are not especially limited, but a distance L1 between a center line G1 of the center main groove 3 and the tire equator C in the tire axial direction is preferably in a range of 7 to 15% of the tread width TW. Similarly, a distance L2 between a center line G2 of the shoulder main groove 4 and a ground-contact end Te in the tire axial direction is preferably in a range of 15 to 30% of the tread width TW. According to this, the rigidities of the land portions 5a to 5c are secured in well balance, and steering stability and uneven wear resistance can be enhanced. The center lines G1 and G2 of the embodiment are formed into corrugated non-linear shapes, and the distances L1 and L2 in the tire axial direction are specified by centers of amplitudes of the center lines G1 and G2.

The tread width TW is a distance between the ground-contact ends Te in the following state: i.e., a normal load is applied to the pneumatic tire 1 in a normal state where a tire is mounted around a normal rim and normal internal pressure is charged into the tire, and the tire is brought into contact with a flat surface at a camber angle of 0°. Sizes of various portions of the tire are values as measured in the normal state unless otherwise specified.

The "normal rim" is a rim determined for each tire by a specification standard including a specification on which the tire is based, and is a "standard rim" specified in JATMA, a "Design Rim" in TRA, and a "Measuring Rim" in ETRTO.

Further, the "normal internal pressure" is an air pressure determined for each tire by the specification standard including the specification on which the tire is based, and is "a maximum air pressure" specified in JATMA, a maximum value described in "TIRE LOAD LIMITS AT VARIOUS COLD INFLATION PRESSURES" in TRA, and "INFLATION PRESSURE" in ETRTO. when the tire is for a passenger vehicle, the normal internal pressure is 180 kPa.

Further, the "normal load" is a load determined for each tire by the specification standard including the specification on which the tire is based, and is "maximum load ability" specified in JATMA, a maximum value descri bed in the Table "TIRE LOAD LIMITS AT VARIOUS COLD INFLATION PRESSURES" in TRA, and a "LOAD CAPACITY" in ETRTO. when the tire is for a passenger vehicle, the normal load is 88% of each of the above loads.

Figure 2:
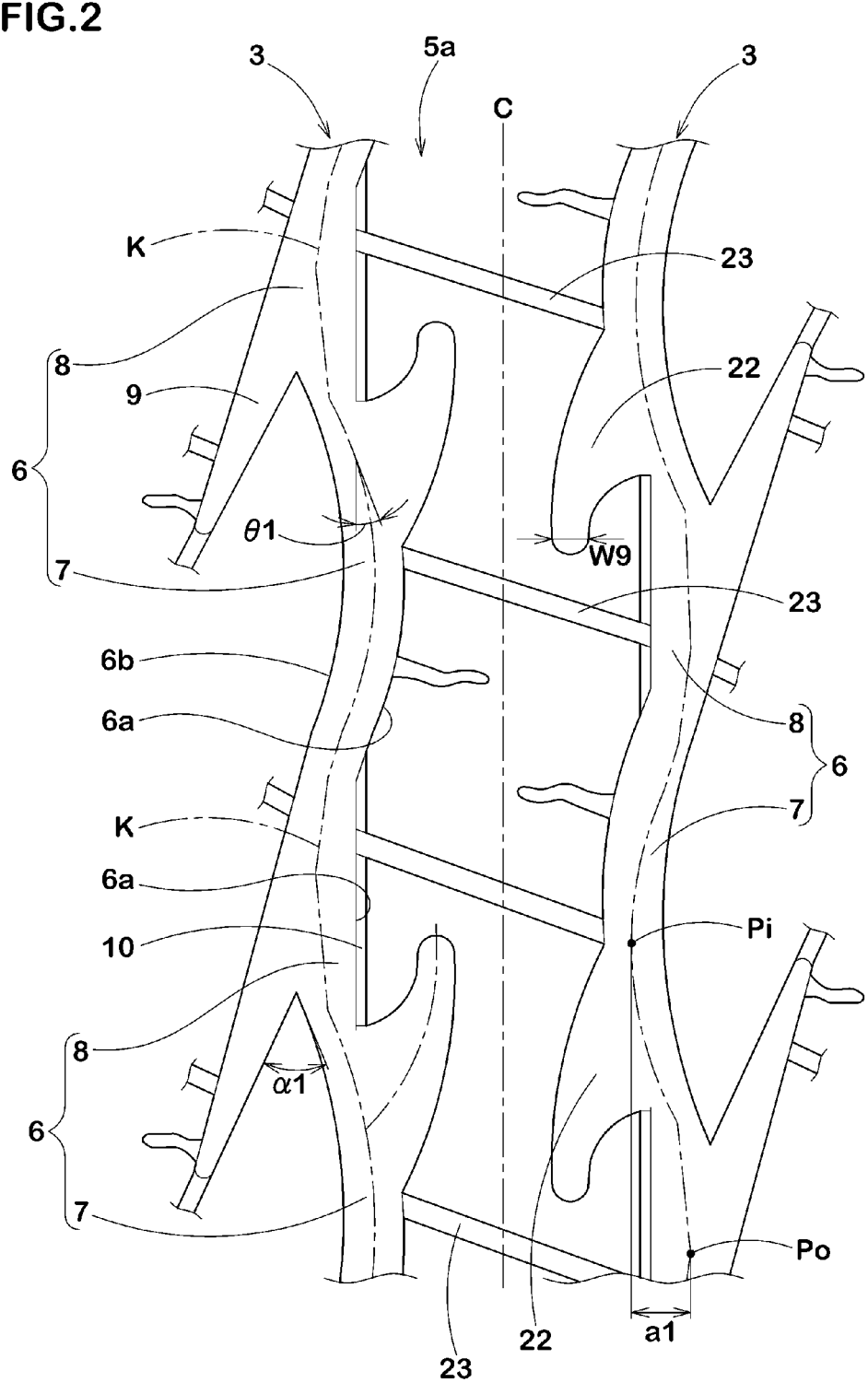
FIG. 2 is an enlarged view of a center land portion shown in FIG. 1.

As shown in FIG. 2 in a close-up manner, each of the center main grooves 3 is formed into a zigzag shape by connecting arc groove pieces 6 to one another in the tire circumferential direction. Each of the arc groove pieces 6 includes an arc portion 7 which is curved to swell toward the tire equator C (rightward in the case of the tread half located on the left side of the tire equator c). That is, each of the center main grooves 3 is formed such that the arc groove piece 6 is a minimum configuration unit of repeated patterns. Such an arc groove piece 6 prevents rigidity of the center land portion 5a from being deteriorated, and can efficiently discharge a water film between a road surface and a portion of the tread portion 2 near the tire equator C. Therefore, drainage performance is enhanced without impairing straight stability. Furthermore, the arc groove piece 6 enhances the rigidity of the middle land portion 5b in the tire axial direction, thereby helping to enhance the uneven wear resistance of the tire.

In the tread half on the left side of the tire equator C in FIG. 2, each of the arc groove pieces 6 of this embodiment includes the arc portion 7 and a straight portion 8. The straight portion 8 includes a groove edge 6a on the side of the tire equator C forming an intersection portion K of the arc groove pieces 6. The groove edge 6a straightly extends in the tire circumferential direction. Such a straight portion 8 is of help to smoothly discharge drainage in the center main groove 3 toward a last-come side of a rotation direction utilizing rotation of the tire. Since the straight portion 8 is of help to secure rigidity of the center land portion 5a in the tire circumferential direction, the uneven wear resistance and steering stability can be maintained.

It is necessary that a zigzag amplitude a1 of the center main groove 3 is in a range of 2 to 5% of the tread width TW. If the zigzag amplitude a1 is smaller than 2% of the tread width TW, a water film on the tread portion 2 near the tire equator C cannot be discharged efficiently. If the zigzag amplitude a1 exceeds 5% of the tread width TW on the other hand, the rigidity of the center land portion 5a is excessively lowered, and the uneven wear resistance and the steering stability are deteriorated. From such a viewpoint, the zigzag amplitude a1 is preferably 2.5% or more and 4.5% or less of the tread width TW. The amplitude a1 is equal to a distance in the tire axial direction between an outermost point Po of the center line G1 of the center main groove 3 in the tire axial direction and an innermost point Pi of the center line G1 in the tire axial direction (hereinafter, this definition is also applied to amplitudes of other grooves).

To further exert the above-described effect, an angle (angle of tangent) θ1 between the center main groove 3 and the tire circumferential direction is preferably 5° or more, and more preferably 15° or more, and preferably 40° or less, and more preferably 30° or less.

Figure 3:
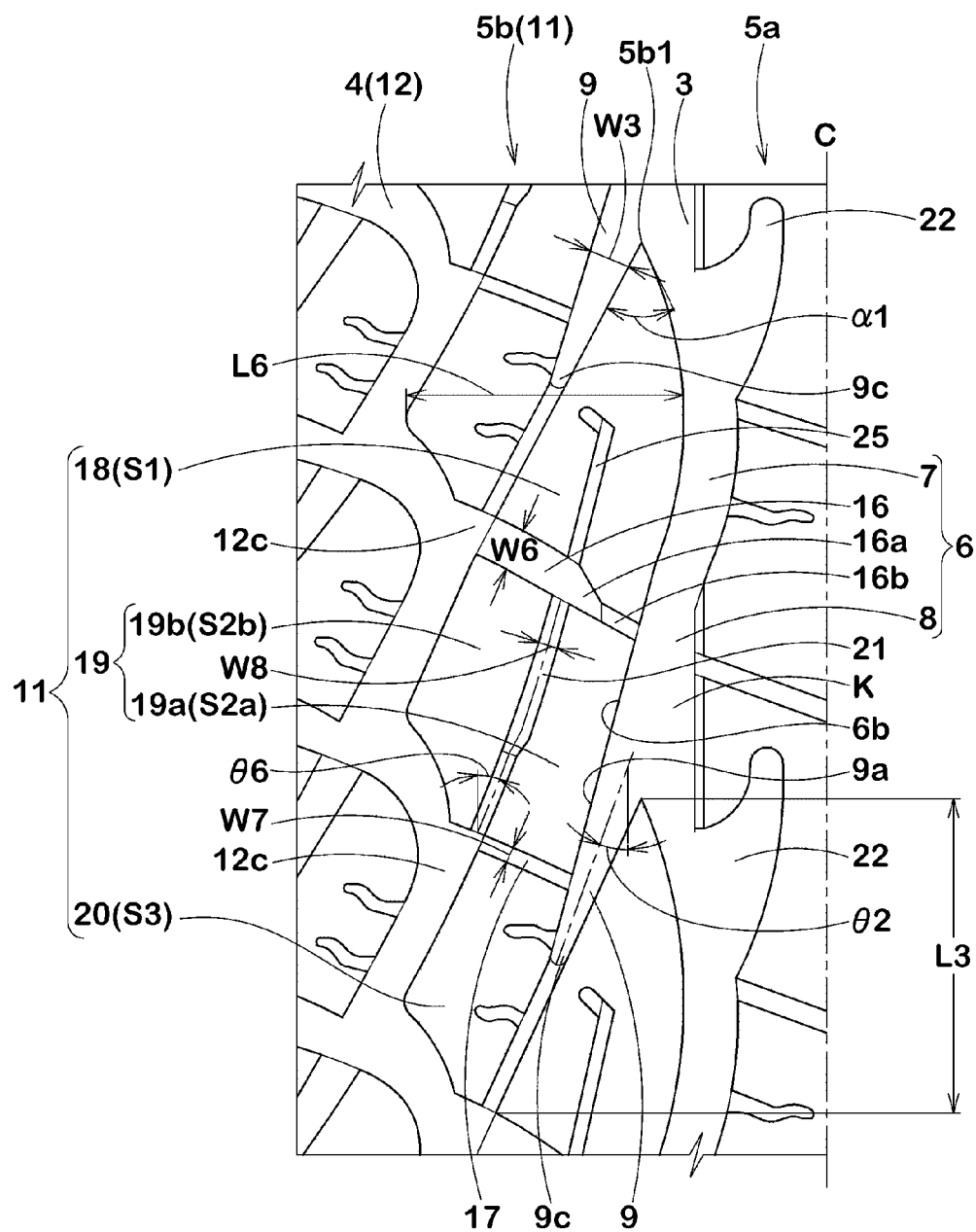
FIG. 3 is an enlarged view of a middle land portion shown in FIG. 1.

As shown in FIG. 3, the middle land portion 5b is provided with a middle inclined groove 9. The middle inclined groove 9 extends to the shoulder main groove 4 from the intersection portion K at which the arc groove pieces 6 that are adjacent to each other in the tire circumferential direction in the center main groove 3 are connected to each other. The middle inclined groove 9 can guide a portion of drainage in the center main groove 3 into the shoulder main groove 4 utilizing rotation of the tire. Therefore, the drainage performance is enhanced.

The middle inclined groove 9 is formed at an angle θ2 of 12 to 30° with respect to the tire circumferential direction. If this angle θ2 exceeds 30°, a drainage resistance in the middle inclined groove 9 is increased to deteriorate the drainage performance. If the angle θ2 is smaller than 12° on the contrary, the rigidity of the middle land portion 5b between the middle inclined groove 9 and the center main groove 3 is reduced to deteriorate the uneven wear resistance and the steering stability. From such a viewpoint, it is preferable that the angle θ2 is 14° or more and 28° or less.

A tip end angle α1 of the middle land portion 5b sandwiched between the middle inclined groove 9 and the center main groove 3 is in a range of 30 to 75°. If the tip end angle α1 exceeds 75°, drainage in the center main groove 3 is less prone to flow toward the last-come side of the center main groove 3 in the tire rotation direction and/or the middle inclined groove 9 to deteriorate the drainage performance. If the tip end angle α1 is less than 30° on the other hand, the rigidity of the middle land portion 5b is lowered to deteriorate the uneven wear resistance and the steering stability. From such a viewpoint, it is preferable that the tip end angle α1 is 35° or more and 70° or less. When a tip end portion of the middle land portion 5b is formed into an arc shape, the tip end angle α1 should be an angle between tangents of a land edge (not shown) of the middle land portion 5b located 2 mm away from a tip end 5b1 in the tire circumferential direction.

A groove width W3 of the middle inclined groove 9 is gradually reduced from the tire equator C toward the ground-contact end Te. Such a middle inclined groove 9 increases a flowing speed of drainage from the tire equator c toward the ground-contact end Te. Therefore, the drainage in the center main groove 3 is prone to be smoothly discharged toward the ground-contact end Te. Rigidity of such a middle inclined groove 9 is relatively increased in a region on an outer side of the middle land portion 5b in the tire axial direction where a ground-contact pressure is prone to be increased at the time of cornering. Therefore, the drainage performance and the uneven wear resistance are maintained in well balance. From such a viewpoint, the tread width TW of the groove width W3 is preferably 2.0% or more, more preferably 2.5% or more, and preferably 4.0% or less, and more preferably 3.5% or less.

Further, from such a viewpoint, a groove depth of the middle inclined groove 9 is preferably 50% or more of a groove depth of the center main groove 3, more preferably 55% or more, and preferably 70% or less, and more preferably 65% or less. The groove depth of the middle inclined groove 9 may be constant, but to ensure the rigidity of the middle land portion 5b in the intermediate term of wear, the middle inclined groove 9 may be provided with a step portion 9c in which the groove depth is gradually reduced toward the shoulder main groove 4. To secure the drainage performance and the rigidity of the middle land portion 5b in well balance, it is preferable that the step portion 9c is provided at a position of 45 to 55% of a length L3 of the middle inclined groove 9 in the tire circumferential direction.

It is preferable that a groove edge 9a of the middle inclined groove 9 of the embodiment on an outer side in the tire axial direction and a groove edge 6b of the arc groove piece 6 on an outer side in the tire axial direction are smoothly connected to each other. According to this, high rigidity of the middle land portion 5b is maintained, and water can smoothly be discharged from the arc groove piece 6 of the center main groove 3 to the middle inclined groove 9.

An outer end of the middle inclined groove 9 of the embodiment in the tire axial direction is connected to the shoulder main groove 4. According to such a middle inclined groove 9, drainage in the center main groove 3 can be discharged to the ground-contact end Te and/or the last-come side in the tire rotation direction through the shoulder main groove 4, thereby further enhancing the drainage performance.

The middle land portion 5b includes middle blocks 11 which are provided at a distance from each other in the tire circumferential direction, the middle blocks 11 are divided by the shoulder main groove 4, the center main groove 3, and the middle inclined grooves 9 by connecting the middle inclined grooves 9 to the shoulder main groove 4.

Figure 4:
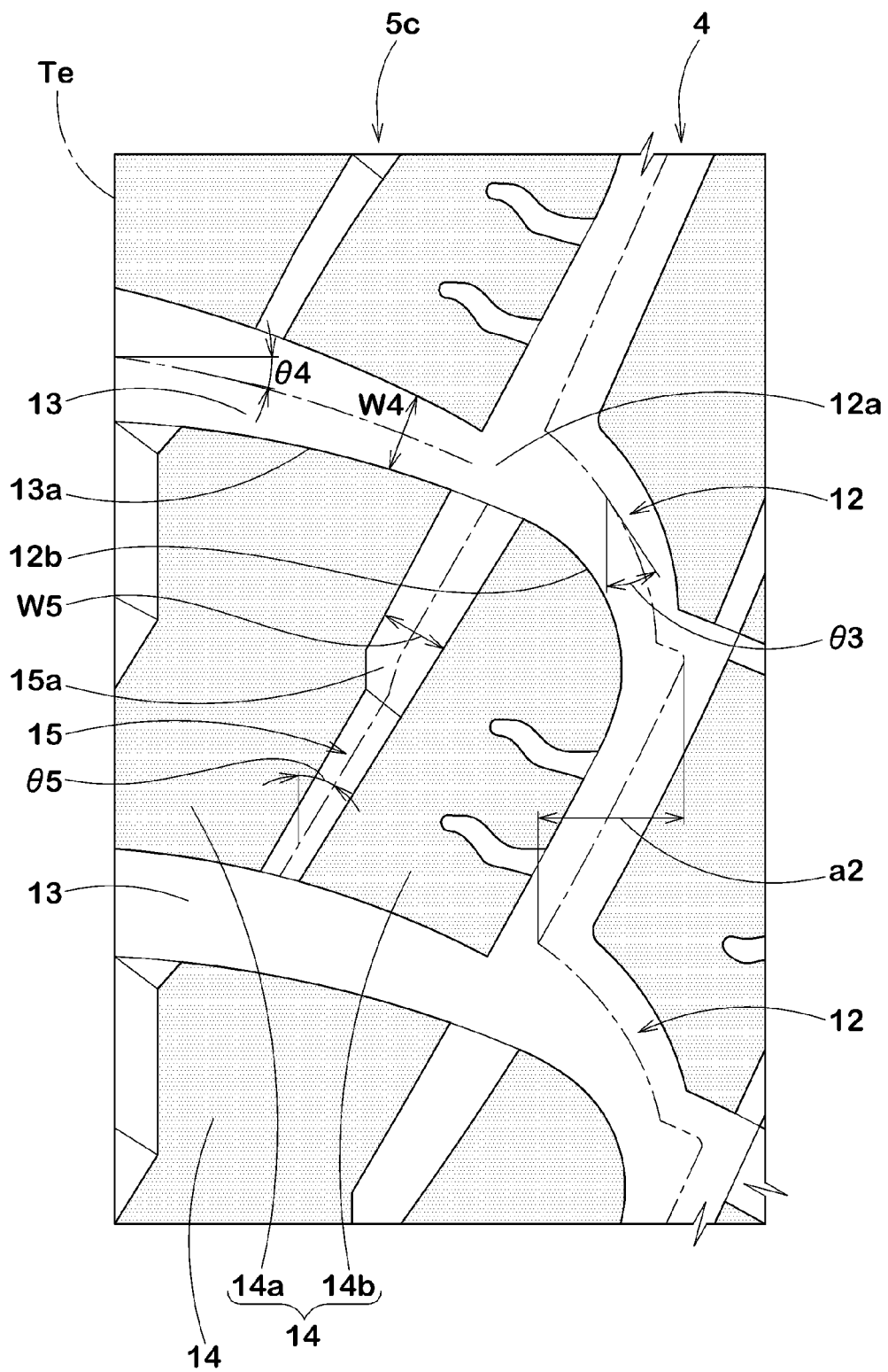
FIG. 4 is an enlarged view of a shoulder land portion shown in FIG. 1.

As shown in FIGS. 1 and 4, the shoulder main groove 4 is formed by connecting curved groove pieces 12 to one another in the tire circumferential direction. Each of the curved groove pieces 12 is curved to swell toward the tire equator C. That is, the shoulder main groove 4 is formed into a zigzag shape such that the curved groove piece 12 is a minimum configuration unit of repeated patterns. Such a shoulder main groove 4 effectively takes in a water film between a road surface and a shoulder portion of the tread portion 2, thereby enhancing the drainage performance.

It is preferable that the zigzag amplitude a2 of the curved groove piece 12 is formed larger than the zigzag amplitude a1 of the arc groove piece 6. Rigidity of such a curved groove piece 12 is increased in the shoulder land portion 5c in the tire axial direction where a relatively large ground-contact pressure is applied at the time of cornering. Therefore, the steering stability is enhanced and generation of shoulder wear of the shoulder land portion 5c is suppressed. If the zigzag amplitude a2 is increased, there is a tendency that the rigidity of the middle land portion 5b is reduced. Therefore, the zigzag amplitude a2 of the curved groove piece 12 is preferably 3% or more of the tread width TW, more preferably 4% or more, and preferably 7% or less, and more preferably 6% or less.

Further, from such a viewpoint, an angle θ3 between the shoulder main groove 4 and the tire circumferential direction is preferably 20° or more, more preferably 30° or more, and preferably 60° or less, and more preferably 55° or less.

As shown in FIG. 1, it is preferable that a length L4 of the curved groove piece 12 in the tire circumferential direction is smaller than a length L5 of the arc groove piece 6 of the center main groove 3 in the tire circumferential direction. That is, the number of curved groove pieces 12 of the larger zigzag amplitude a2 is greater than the number of arc groove pieces 6. Therefore, the pneumatic tire 1 of the embodiment can obtain sufficient drainage performance at the shoulder portion.

As shown in FIG. 4, the shoulder land portion 5c includes shoulder lug grooves 13 which are provided at a distance from each other in the tire circumferential direction, the shoulder lug grooves 13 extend from one end 12a of the curved groove piece 12 in the tire circumferential direction beyond the ground-contact end Te. According to this, the shoulder land portion 5c includes shoulder blocks 14 which are provided at a distance from each other in the tire circumferential direction, the shoulder blocks 14 are divided by the shoulder main groove 4, the ground-contact end Te and the shoulder lug grooves 13.

In the embodiment, the shoulder lug groove 13 is smoothly connected to the end 12a of the curved groove piece 12. More specifically, in this embodiment, one side groove edge 13a (lower side in this example) of the shoulder lug groove 13 in the tire circumferential direction and an outer side edge 12b of the curved groove piece 12 in the tire axial direction are smoothly connected to each other. According to this, drainage resistance from the shoulder main groove 4 to the shoulder lug groove 13 is reduced, thereby obtaining excellent drainage performance. Since high rigidity of a corner portion of the shoulder block 14 is maintained, the uneven wear resistance is excellent.

To secure the drainage performance and the rigidity of the shoulder block 14 in the tire circumferential direction in well balance, an angle θ4 of the shoulder lug groove 13 with respect to the tire axial direction is preferably 2° or more, more preferably 6° or more, and preferably 20° or less, and more preferably 16° or less.

To enhance the drainage performance, it is preferable that a groove width W4 of the shoulder lug groove 13 is gradually increased toward the ground-contact end Te. To achieve balance between the drainage performance and the rigidity of the shoulder block 14, the groove width W4 is preferably 5.0 mm or more, more preferably 6.0 mm or more, and preferably 15.0 mm or less, and more preferably 13.5 mm or less. Similarly, a groove depth of the shoulder lug groove 13 is preferably 50% or more of a groove depth of the shoulder main groove 4, more preferably 55% or more, and preferably 70% or less, and more preferably 65% or less.

The shoulder land portion 5c is provided with a shoulder inclined groove 15. The shoulder inclined groove 15 extends from one end 12a of the curved groove piece 12 of the shoulder main groove 4 in the tire circumferential direction to the shoulder lug groove 13 such that the shoulder inclined groove 15 has an opposite inclination to the shoulder lug groove 13 with respect to the tire axial direction. According to this, drainage in the shoulder main groove 4 can more effectively be discharged into the shoulder lug groove 13 and therefore into the ground-contact end Te through the shoulder inclined groove 15.

The shoulder block 14 is divided, by the shoulder inclined groove 15, into an outer shoulder block 14a on an outer side in the tire axial direction and an inner shoulder block 14b in the tire axial direction.

To ensure block rigidities of the outer shoulder block 14a and the shoulder block 14b and to enhance the drainage performance, an angle θ5 of the shoulder inclined groove 15 with respect to the tire circumferential direction is preferably 15° or more, more preferably 20° or more, and preferably 55° or less, and more preferably 45° or less. Similarly, a groove width W5 of the shoulder inclined groove 15 is preferably 1.5% or more of the tread width TW, more preferably 2.5% or more, and preferably 4.5% or less, and more preferably 3.5% or less. A groove depth of the shoulder inclined groove 15 is preferably 15% or more of a groove depth of the shoulder main groove 4, more preferably 20% or more, and preferably 50% or less, and more preferably 40% or less.

The groove width W5 of the shoulder inclined groove 15 may be constant, but may be gradually reduced toward the ground-contact end Te. The shoulder inclined groove 15 of the embodiment includes a reduced portion 15a whose groove width W5 is locally reduced. According to such a shoulder inclined groove 15, the flowing speed of drainage toward the ground-contact end Te can be increased and the drainage performance can further be enhanced while maintaining the rigidity of the shoulder block 14.

As shown in FIG. 1, in this embodiment, the shoulder inclined groove 15, the curved groove piece 12, and the middle inclined groove 9 are smoothly connected with each other substantially straightly. That is, these grooves are connected to each other such that the middle inclined groove 9 continuously extends to the shoulder lug groove 13 through the curved groove piece 12 and the shoulder inclined groove 15. Therefore, drainage in the center main groove 3 is smoothly discharged to the ground-contact end Te, thereby further enhancing the drainage performance.

As shown in FIG. 3, the middle block 11 includes a first middle auxiliary groove 16 whose one end is connected to a top 12c of the curved groove piece 12 of the shoulder main groove 4 on the side of the tire equator C and whose other end is connected to the intersection portion K of the arc groove piece 6 of the center main groove 3, and a second middle auxiliary groove 17 which is deviated in position from the first middle auxiliary groove 16 in the tire circumferential direction and which connects the curved groove piece 12 and the middle inclined groove 9 with each other. According to this, the middle block 11 is divided into three blocks, i.e., a first block 18 formed on the side of the tire equator c, a third block 20 formed on the side of the ground-contact end Te, and a second block 19 located between the first block 18 and the third block 20.

A groove width W6 of the first middle auxiliary groove 16 may be constant, but it is preferable that the first middle auxiliary groove 16 includes an enlarged portion 16a in which the groove width W6 is locally enlarged toward the ground-contact end Te. According to such a middle auxiliary groove 16, a large groove width on the side of the ground-contact end Te is secured and the drainage performance is enhanced while maintaining rigidities of the first block 18 and the second block 19.

To achieve a balance between the enhancement of the drainage performance and the securement of rigidities of the first to third blocks 18 to 20, it is preferable that the groove width W6 of the first middle auxiliary groove is in a range of 5 to 10 mm, and a groove width W7 of the second middle auxiliary groove 17 is in a range of 1.5 to 3.5 mm. Similarly, a groove depth of the first middle auxiliary groove 16 and a groove depth of the second middle auxiliary groove 17 are preferably in a range of 55 to 65% of a groove depth of the center main groove 3. The groove depth of the first middle auxiliary groove 16 may be constant, but to smoothen the drainage toward the ground-contact end Te, the first middle auxiliary groove 16 may be provided with a step portion 16b whose groove depth is gradually increased toward the ground-contact end Te.

The second block 19 is divided by a third middle auxiliary groove 21 into a second inner block 19a on the side of the tire equator c and a second outer block 19b on the side of the ground-contact end Te. One end of the third middle auxiliary groove 21 is connected to a portion of the curved groove piece 12 near its top on the side of the tire equator C, and the other end of the third middle auxiliary groove 21 is connected to the first middle auxiliary groove 16.

To achieve a balance between the rigidity of the second block 19 and the enhancement of the drainage performance, it is preferable that a groove width W8 of the third middle auxiliary groove 21 is in a range of 2 to 5 mm, and a groove depth of the third middle auxiliary groove 21 is in a range of 2 to 5% of the groove depth of the center main groove 3. An angle θ6 of the third middle auxillary groove 21 with respect to the tire circumferential direction is preferably in a range of 15 to 35°.

As shown in FIG. 3, since the shoulder lug grooves 13 are formed on outer sides of the second outer block 19b and the third block 20 in the tire axial direction in this embodiment, a large ground-contact pressure is prone to be applied to the second outer block 19b and the third block 20. Therefore, to enhance the uneven wear resistance, it is preferable that a tread area of the second outer block 19b and a tread area of the third block 20 which are adjacent to each other in the tire circumferential direction are substantially equal to each other. More preferably, it is preferable that a difference between the tread area S2b of the second outer block 19b and the tread area S3 of the third block 20 is 30% or less of the tread area S2b or S3 of smaller one of the second outer block 19b or the third block 20, and more preferably 15% or less.

In this embodiment, the first block 18 has a substantially triangular shape formed between the middle inclined groove 9 and the center main groove 3. On the other hand, the second inner block 19a, the second outer block 19b and the third block 20 have substantially rectangular shapes. Hence, in the middle land portion 5b of the embodiment, the rigidity of the first block 18 is prone to be the smallest, and there is a tendency that uneven wear is easily generated in the first block 18. Hence, it is necessary to relatively increase the tread area of the first block 18, and to enhance the uneven wear resistance. From such a viewpoint, it is preferable that a tread area S1 of the first block 18 is formed larger than the tread area S2a of the second inner block 19a, the tread area S2b of the second outer block 19b, and the tread area S3 of the third block 20.

On the other hand, if the tread area S1 of the first block 18 becomes large, a rigidity balance between the second inner block 19a, the second outer block 19b, and the third block 20 is deteriorated, and there is a possibility that the uneven wear resistance is lowered. From such a viewpoint, it is preferable that the tread area S2a of the second inner block 19a, the tread area S2b of the second outer block 19b, and the tread area S3 of the third block 20 are 40% or more of the tread area 51 of the first block 18, more preferably 50% or more, and preferably 90% or less, and more preferably 80% or less.

The first block 18 is provided with a middle lug groove 25 which extends from the first middle auxiliary groove 16 toward the middle inclined groove 9 and terminates without coming into contact with the middle inclined groove 9. Such a middle lug groove 25 is of help to moderate the rigidity of the first block 18 and to exert the uneven wear resistance.

In the embodiment, as shown in FIGS. 1 and 3, the first middle auxiliary groove 16, the curved groove piece 12 and the shoulder lug groove 13 are smoothly connected to each other. That is, they are connected to each other such that the first middle auxiliary groove 16 substantially continuously extends to the shoulder lug groove 13 through the curved groove piece 12. Similarly, the second middle auxiliary groove 17, the curved groove piece 12 and the shoulder lug groove 13 are smoothly connected to each other. That is, they are connected to each other such that the second middle auxiliary groove 17 substantially continuously extends to the shoulder lug groove 13 through the curved groove piece 12. According to this, drainage in the center main groove 3 and/or the middle inclined groove 9 is more smoothly discharged to the ground-contact end Te, thereby further enhancing the drainage performance.

A drainage path formed by the first middle auxiliary groove 16, the curved groove piece 12 and the shoulder lug groove 13, and a drainage path formed by the second middle auxiliary groove 17, the curved groove piece 12 and the shoulder lug groove 13 are inclined diagonally left up in the example of the tread portion 2 on the left side of the tire equator C in FIG. 1. On the other hand, a drainage path formed by the middle inclined groove 9, the curved groove piece 12 and the shoulder inclined groove 15 is inclined diagonally left down in this example. Therefore, the pneumatic tire 1 of the embodiment can exert great drainage performance without depending upon the tire rotation direction.

As shown in FIG. 2, the center land portion 5a includes center slots 22 which are provided at a distance from each other in the tire circumferential direction, the center slots 22 extend from the arc groove pieces 6 with an inclination in the same direction as that of the middle inclined groove 9 and terminate without reaching the tire equator C. Since such center slots 22 can more reliably discharge a water film between a road surface and the tread portion 2 on the side of the tire equator c, it is possible to further enhance the drainage performance. Especially, since a groove width W9 of the center slot 22 of the embodiment is gradually increased toward the center main groove 3, it is possible to reliably discharge the water film.

The center land portion 5a is provided with a plurality of center lateral grooves 23 coming across the center land portion 5a. The center lateral grooves 23 are inclined with respect to the tire axial direction.

It is preferable that the center land portion 5a is provided with a chamfered portion 10 formed by diagonally notching the straight portion 8 in a constant width. Such a chamfered portion 10 is of help to moderate stress concentration generated on the groove edge 6a on the side of the tire equator C to which a relatively large ground-contact pressure is applied at the time of straight running, and to enhance the uneven wear resistance.

As shown in FIG. 1, it is preferable that the center land portion 5a, the third block 20 and the inner shoulder block 14b of the embodiment are provided with sipings 24. Such sipings 24 are of help to moderate the rigidity of the blocks provided with the sipings, and to exert the uneven wear resistance. It is preferable that a siping width of the siping 24 is in a range of 1.5 to 3.5 mm, a depth thereof is in a range of 20 to 30% of a groove depth of the center main groove 3, and a length of the siping 24 in the tire axial direction is in a range of 40 to 60% of a width of each block in the tire axial direction.

Although the embodiment of the invention has been described in detail, the invention is not limited to the embodiment and the invention can variously be modified and carried out of course.

EXAMPLE

To confirm the effects of the invention, pneumatic tires (size LT315/75R16 121s) having the pattern shown in FIG. 1 were prototyped based on the specification shown in Table 1. Various kinds of performances of them were evaluated. Concrete sizes are as follows. All of conditions except the specification of Table 1 are the same.

<Center Main Grooves>
  Groove width W1/ground-contact width TW: 3.5 to 6.0%
  Groove depth: 12.8 to 13.2 mm
  Angle $\theta 1$ with respect to tire circumferential direction: 15 to 25°
  Installation position L1/TW: 8%
<Shoulder Main Grooves>
  Groove width W2/ground-contact width TW: 3.0 to 4.5%
  Groove depth: 12.8 to 13.2 mm
  Angle $\theta 3$ with respect to tire circumferential direction: 25 to 35°
  Installation position L2/TW: 18%
<Middle Inclined Groove>
  Groove width W3: 1.6 to 3.6 mm
  Groove depth: 3.0 to 8.2 mm
<Shoulder Lug Groove>
  Groove width W4: 2.5 to 6.5 mm
  Groove depth: 7.2 to 13.7 mm
  Angle $\theta 4$ with respect to tire axial direction: 6.5 to 14.0°
<Shoulder Inclined Groove>
  Groove width W5: 1.3 to 3.2 mm
  Groove depth: 2.8 to 5.2 mm
  Angle $\theta 5$ with respect to tire circumferential direction: 27 to 38°
<Others>
  Length L4 of curved groove piece in tire circumferential direction: 21.0 to 30.5 mm
  Length L5 of arc groove piece in tire circumferential direction: 43.0 to 59.5 mm
  Area ratio S2a/S1 between first block and second inner block: 53%
  Area ratio S3/S1 between first block and third block: 58%
  Tread width TW: 242 mm
  Test method is as follows:
<Steering Stability>

The prototyped tires were assembled around rims of 16×8.0 and mounted on all of wheels of a four-wheel-drive vehicle of 4800 cc displacement under conditions of an internal pressure of 275 kPa and a vertical load of 8.53 kN, only a driver rode in the vehicle, and a lane change was repeated at 60 km/h on a dry asphalt road of a tire test course. Steering stability of each test tire was evaluated in a five-point method by a driver's sensory evaluation. The greater the numeric value is, the more excellent the steering stability is.

<Drainage Performance>

The prototyped tires were mounted on all of the wheels of the test vehicle under the above conditions, only a driver rode in the vehicle, and steering stability when a lane change was repeated at 60 km/h on a wet asphalt road of water depth of 4 to 6 mm was evaluated in a five-point method by a driver's sensory evaluation. The greater the numeric value is, the more excellent the steering stability is.

<Uneven Wear Resistance>

The prototyped tires were mounted on all of the wheels of the test vehicle under the above conditions, the vehicle was made to run 24,000 km on a public road, and it was checked by the naked eye whether shoulder portions were unevenly worn. A degree of uneven wear was evaluated in a five-point method. The greater the numeric value is, the more excellent the result is.

Results and the like of the test are shown in Table 1.

TABLE 1

|  | Com. Ex. 1 | Com. Ex. 2 | Ex. 1 | Ex. 2 | Ex. 3 | Com. Ex. 3 | Com. Ex. 4 | Ex. 4 | Ex. 5 | Com. Ex. 5 | Com. Ex. 6 |
|---|---|---|---|---|---|---|---|---|---|---|---|
| Ratio a1/TW (%) between zigzag amplitude a1 of center main groove and tread width TW | 1 | 6 | 3.5 | 2 | 5 | 3.5 | 3.5 | 3.5 | 3.5 | 3.5 | 3.5 |
| Angle θ2 (°) of middle inclined groove | 20 | 20 | 20 | 20 | 20 | 10 | 40 | 12 | 30 | 20 | 20 |
| Tip end angle α1 (°) of land portion sandwiched between middle inclined groove and center main groove | 45 | 45 | 45 | 45 | 45 | 45 | 45 | 45 | 45 | 20 | 80 |
| Area ratio SA/SB (%) of road surface | 5 | 5 | 5 | 5 | 5 | 5 | 5 | 5 | 5 | 5 | 5 |
| Ratio a2/TW between zigzag amplitude a2 of shoulder main groove and tread width TW | 5 | 5 | 5 | 5 | 5 | 5 | 5 | 5 | 5 | 5 | 5 |
| Drainage performance | 3 | 2 | 5 | 4 | 3 | 5 | 1 | 5 | 3 | 4 | 1 |
| Uneven wear resistance | 3 | 3 | 5 | 5 | 4 | 2 | 5 | 3 | 5 | 2 | 3 |
| Steering stability | 3 | 3 | 5 | 4 | 4 | 2 | 3 | 4 | 3 | 3 | 5 |

|  | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Ratio a1/TW (%) between zigzag amplitude a1 of center main groove and tread width TW | 3.5 | 3.5 | 3.5 | 3.5 | 3.5 | 3.5 | 3.5 | 3.5 | 3.5 | 3.5 |
| Angle θ2 (°) of middle inclined groove | 20 | 20 | 20 | 20 | 20 | 20 | 20 | 20 | 20 | 20 |
| Tip end angle α1 (°) of land portion sandwiched between middle inclined groove and center main groove | 30 | 75 | 45 | 45 | 45 | 45 | 45 | 45 | 45 | 45 |
| Area ratio SA/SB (%) of road surface | 5 | 5 | 40 | 20 | 25 | 30 | 5 | 5 | 5 | 5 |
| Ratio a2/Tw between zigzag amplitude a2 of shoulder main groove and tread width TW | 5 | 5 | 5 | 5 | 5 | 5 | 2 | 8 | 3 | 7 |
| Drainage performance | 4 | 3 | 5 | 5 | 5 | 5 | 4 | 5 | 4 | 5 |
| Uneven wear resistance | 3 | 4 | 1 | 4 | 3 | 2 | 4 | 3 | 5 | 4 |
| Steering stability | 4 | 5 | 5 | 5 | 5 | 5 | 4 | 5 | 4 | 5 |

SA: absolute value of difference between tread area S2b of second outer block and tread area S3 of third block
SB: area of smaller one of tread area S2b of second outer block and tread area S3 of third block As a result of the test, it could be confirmed that the steering stability and the uneven wear resistance of the tires of the embodiment were enhanced while maintaining drainage performance compared with those of tires of the comparative examples.

What is claimed is:

1. A pneumatic tire comprising a tread portion provided on each side of the tire equator with a center main groove and an axially outer shoulder main groove each extending continuously in the tire circumferential direction so that the tread portion is divided into a center land portion between the center main grooves, a pair of middle land portions between the center main grooves and the shoulder main grooves, and a pair of shoulder land portions axially outside the respective shoulder main grooves, wherein the center main grooves are each formed by circumferentially-connected arc groove pieces each comprising an arc portion curved so as to swell toward the tire equator, and the center main grooves each have a zigzag shape and a zigzag amplitude of from 2% to 5% of a tread width of the tread portion, the middle land portions are each provided with middle inclined grooves so as to circumferentially divide the middle land portion into middle blocks, and the middle inclined grooves each extend axially outwardly from one of intersection portions of the arc groove pieces of the adjacent center main groove to the adjacent shoulder main groove at an angle of from 12 to 30 degrees with respect to the tire circumferential direction so that a tip end angle of a land portion sandwiched between each middle inclined groove and the center main groove is in a range of from 30 to 75 degrees, and the width of each middle inclined groove is gradually decreased toward the axially outside of the tire, the shoulder main grooves are each formed by circumferentially-connected curved groove pieces each curved so as to swell toward the tire equator, and the shoulder main grooves each have a zigzag shape and a zigzag amplitude larger than those of the center main grooves, and the middle blocks are each provided with a first middle auxiliary groove extending from the adjacent arc groove piece of the center main groove to the adjacent shoulder main groove and a second middle auxiliary groove extending from the adjacent curved groove piece of the shoulder main groove to the adjacent middle inclined groove, so that the middle block is divided into a first portion on a tire equator side, a third portion on a tread edge side, and a second portion therebetween, said second portion is divided into an inner part on a tire equator side and an outer part on a tread edge side by a third middle auxiliary groove extending from said first middle auxiliary groove to said adjacent curved groove piece, and said outer part and said third portion have ground contacting areas whose difference is not more than 30% of the smaller one of them.

2. The pneumatic tire according to claim 1, wherein the axially inner edge of each said center main groove has, in the intersection portions of the arc groove pieces, straight portions extending parallel with the tire circumferential direction.

3. The pneumatic tire according to claim 1, wherein
each said shoulder land portion is provided with a shoulder lug groove and a shoulder inclined groove both extending from one circumferential end of each of the curved groove pieces of the adjacent shoulder main groove, and the shoulder lug groove inclines at an angle of from 2 to 20 degrees with respect to the tire axial direction and extends to the tread edge, whereas the shoulder inclined groove inclines at an angle of from 15 to 55 degrees with respect to the tire circumferential direction oppositely to the shoulder lug groove and extends to the next shoulder lug groove.

4. The pneumatic tire according to claim 3, wherein the width of said shoulder inclined groove is gradually decreased toward the axially outside of the tire.

5. The pneumatic tire according to claim 1, wherein the circumferential lengths of the curved groove pieces are shorter than the circumferential lengths of the arc groove pieces.

6. The pneumatic tire according to claim 1, wherein said first portion has a ground contacting area more than that of each of said inner part, said outer part and said third portion.

7. The pneumatic tire according to claim 1, wherein the center land portion is provided with center slots which extend axially inwardly from the respective arc groove pieces, while inclining in the same direction as the middle inclined grooves, and terminate without reaching to the tire equator.

\* \* \* \* \*